UNITED STATES PATENT OFFICE.

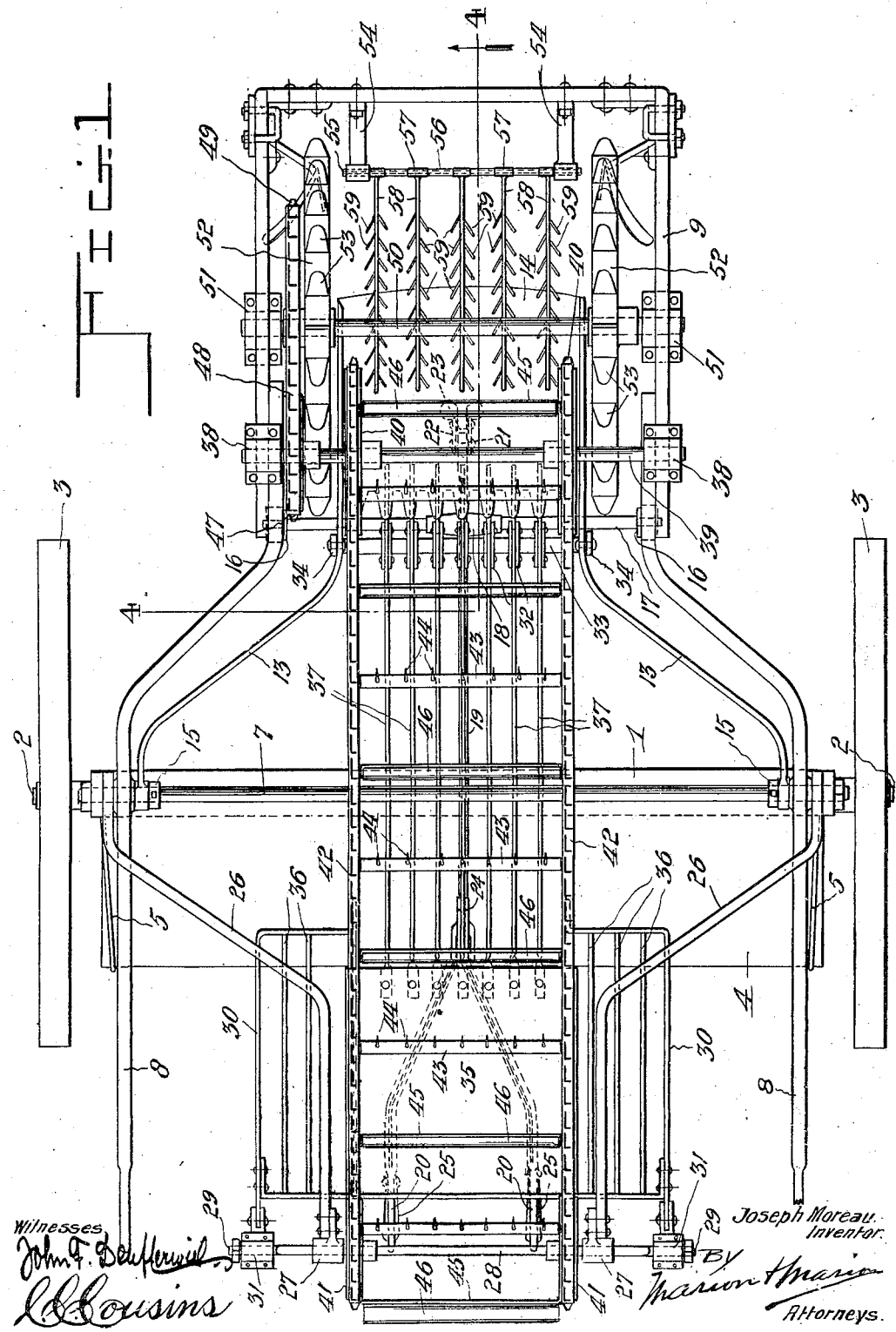

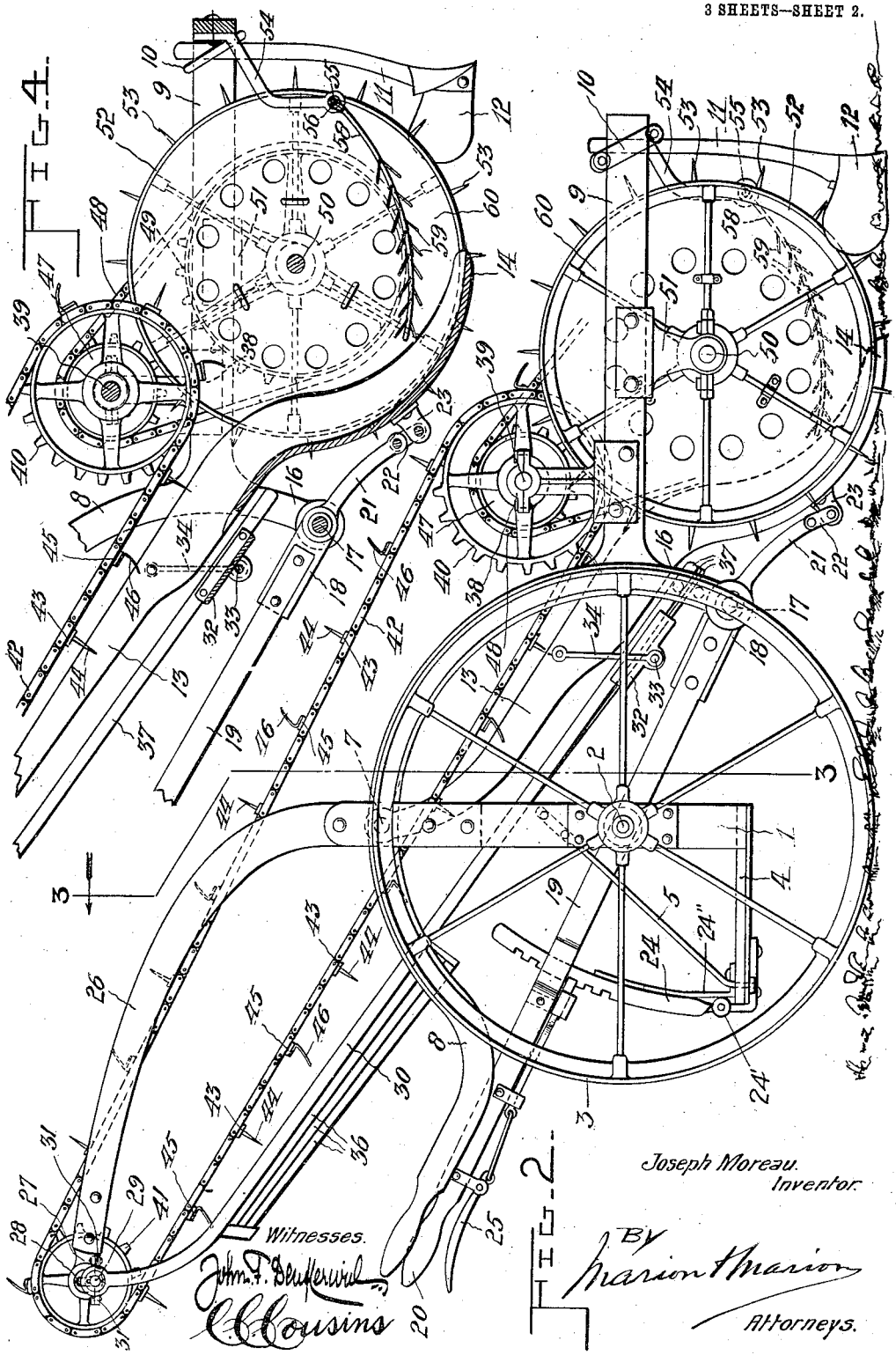

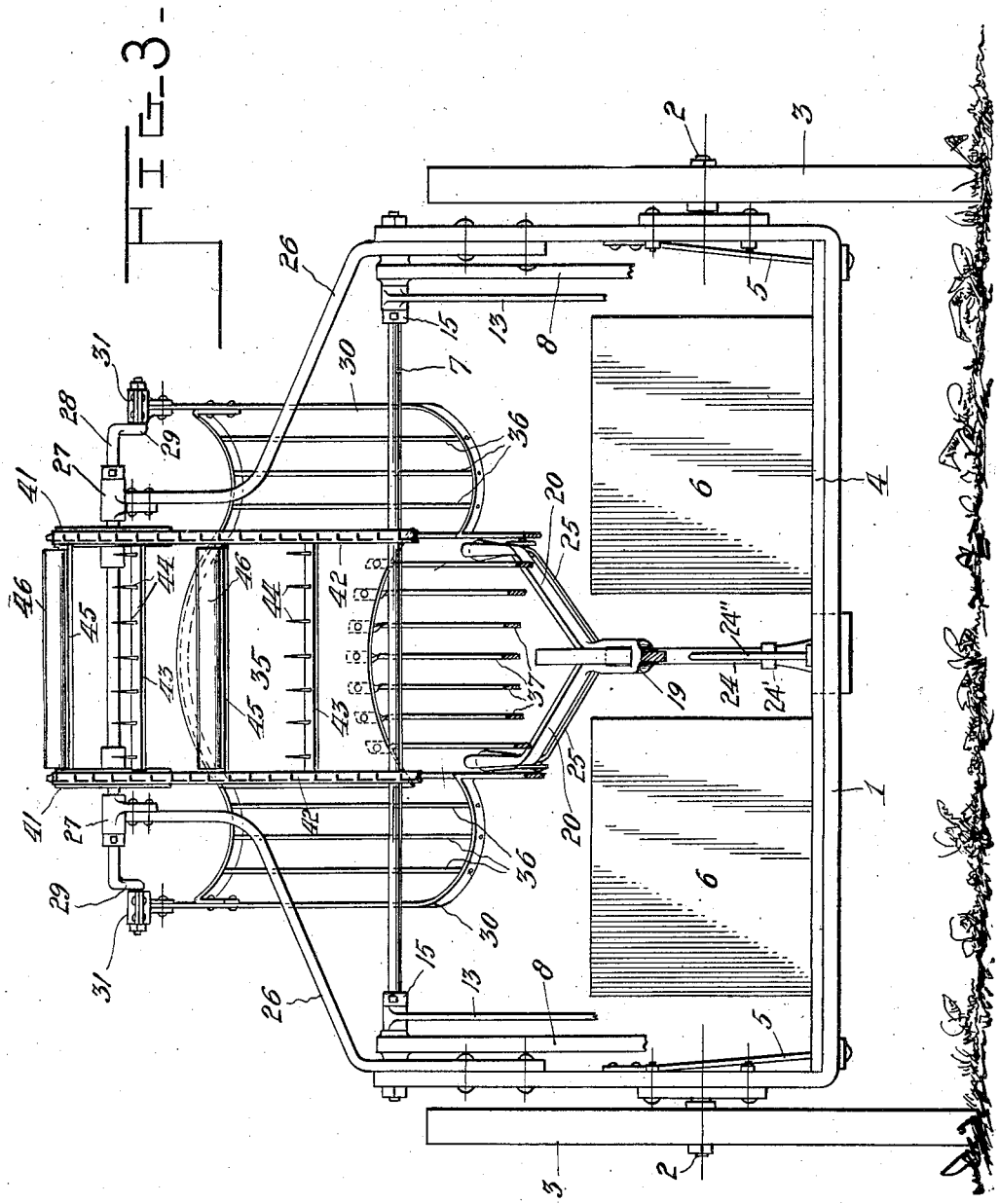

JOSEPH MOREAU, OF ST. GERMAIN DE GRANTHAM, QUEBEC, CANADA.

POTATO-DIGGER.

No. 877,356.  Specification of Letters Patent.  Patented Jan. 21, 1908.

Application filed March 23, 1907. Serial No. 364,083.

*To all whom it may concern:*

Be it known that I, JOSEPH MOREAU, a subject of the King of Great Britain, residing at St. Germain de Grantham, county of Drummond, in the Province of Quebec, Canada, have invented certain new and useful Improvements in Potato-Diggers; and I do hereby declare that the following is a full, clear, and exact description of the invention, such as will enable others skilled in the art to which it appertains to make and use the same.

My invention relates to potato diggers, and the object of my invention is to provide a construction adapted to dig the potatoes, to elevate and deposit the vines behind the operator, to separate the soil from the potatoes, and, finally to deposit the potatoes in receptacles carried by the implement.

A more specific object is to provide a construction which will set normally in operative position, without the operator having to hold the same by its handles, and to provide a pivoted digging member with means for controlling the same independently of the remainder of the implement.

A further object is to provide means for operating the conveying mechanism independently of the supporting wheels, so that the forward end of the implement may be elevated, and the conveying mechanism be rendered inoperative.

My invention consists of the construction, combination and arrangement of parts, as herein illustrated, described and claimed.

In the accompanying drawings, forming part of this application, I have illustrated one form of embodiment of my invention, in which drawings similar reference characters designate corresponding parts, and in which:

Figure 1 is a plan view; Fig. 2 is a side elevation, looking at the right-hand side of the implement, with the receptacle removed; Fig. 3 is a vertical section taken approximately on line 3—3 of Fig. 2, looking in the direction indicated by the arrow; and, Fig. 4 is a fragmentary detail, in vertical longitudinal section, taken approximately on line 4—4 of Fig. 1, looking in the direction indicated by the arrow.

Referring to the drawings, 1 designates a vertically disposed U-shaped supporting frame, provided with pintles 2 on its outer sides, on which pintles are rotatably disposed the supporting wheels 3. Carried by and projecting rearwardly from the lower portion of the frame 1, is a platform 4, held in position by means of the braces 5, and adapted to support receptacles 6 for the reception of the potatoes after they are dug and freed from soil and vines.

Disposed transversely of and supported by the frame 1, is a horizontal shaft 7, on which are disposed rockable handles 8, which handles in side elevation are curved for the greater portion of their length, so that they may be pivoted adjacent the center and will have projecting therefrom the rearwardly extended grips, as best shown in Figs. 1 and 2. Carried by the forward end of the handles 8, is a rectangular frame 9.

A pair of supporting arms 13 have their rear ends pivotally disposed on the supporting shaft 7, and intermediate of their ends are bent inwardly, and have their forward ends secured to a digging member 14, which digging member is upwardly curved from its lower end, and is secured to the end faces of the forward ends of the members 13, so that as its lower edge enters the soil beneath the potatoes and the implement is carried forward, the soil and potatoes will be given a rotary or churning motion on the upper surface of the digging member 14, and will be gradually forced back and upward onto the separating mechanism hereinafter described. The rear ends of the members 13 are locked against longitudinal movement on the shaft 7 by means of the collars 15.

The forward ends of the handles 8 are provided with downwardly extending bearing blocks 16, carrying a transverse horizontal shaft 17. Rockably disposed on the shaft 17 is a sleeve 18, to the rear end of which is connected a lever 19, extending longitudinally and rearwardly of the implement, and terminating in bifurcated handles 20. Carried by the forward end of the sleeve 18 is a projection 21, to which is pivotally connected one end of a link 22, the opposite end of which link is pivoted to an ear 23 carried on the under face of the digging member 14. A segmental rack 24 is disposed adjacent the path of movement of the lever 19, and the lever 19 may be locked in any desired position by means of the pawls 25, carried by the handles 20. Rack 24 is provided with a hinged joint 24' to allow it to swing in the direction of the travel of the lever 19 as the digger is elevated and is held normally upright by spring 24.

Carried by the upper ends of the frame member 1, are upwardly and inwardly curved and rearwardly extending supporting arms 26, provided at their rear ends with bearings 27, adapted to receive the horizontal transverse shaft 28, provided at its ends with cranks 29.

A separator supporting frame 30 is secured to bearings 31 disposed on the cranks 29, so that when the shaft 28 is rotated, the supporting frame 30 will be reciprocated. Suitable bearings 32 are disposed at the front end of the frame 30, which is downwardly inclined from its rear end, and a shaft 33 is disposed in the bearings 32, and is pivotally supported by means of the links 34, which have their upper ends connected to the forward ends of the inwardly curved supporting arms 13.

The upper end of the frame 30 is provided with curved portions on each side, and an upwardly curved central portion. Carried by the central portion of the frame 30, is a convex central plate 35. Carried by the curved side portions of the frame 30, are slats 36, disposed longitudinally of the implement, adapted to receive the potatoes which roll from the plate 35, and further adapted to permit the passage of the soil and to retain the potatoes and direct them into the receptacles 6, which are disposed below the lower ends of the curved portions of the frame 30, on the platform 4. Longitudinally disposed slats 37 have their rear and upper ends connected to the lower and forward edge of the plate 35, and have their forward and lower ends projecting to a point immediately under the rear edge of the curved digging member 14, so as to receive the dug potatoes and soil as they fall from the rear edge of said digging member.

Carried by the rectangular frame 9, on each side thereof, are bearings 38, in which is disposed a transverse horizontal shaft 39. Secured on the shaft 39 are two sprocket-wheels 40, disposed in alinement with two sprocket-wheels 41 secured on the shaft 28. Disposed over each pair of the sprocket wheels 40 and 41, are chains 42, connected at intervals by transverse bars 43, having spurs 44 thereon adapted to catch and elevate the vines of the potatoes as they are dug, and to carry the same upward and backward and drop them at a point behind an operator grasping the handles 20. Connecting the chains 42 at intervals are bars 45, provided with scrapers 46, adapted to keep the central plate 35 of the separating mechanism free from accumulation of soil, or other matter.

Secured on one end of the shaft 39 is a sprocket wheel 47, over which is run a chain 48, which chain is disposed around a sprocket wheel 49 secured on a transverse horizontal shaft 50. The shaft 50 is rotatably disposed in bearings 51, carried by the rectangular frame 9. Secured on the shaft 50 are forward supporting wheels 52, provided with peripheral friction spurs 53, by means of which the wheels 52 are caused to rotate when the machine is moved forward in its normally operative position, and further by means of which mechanism the elevating chain 42 is caused to move. When it is desired to turn the implement or transport it from place to place, the forward end thereof may be elevated by depressing the handles 8, so that the elevating mechanism will not be actuated, as the wheels 52 will be lifted out of contact with the soil.

Carried by each of the wheels 52 is a disk 60. As the soil is lifted by the digging mechanism 14, it will be retained thereon by the supporting arms 13 and the disks 60. The forward movement of the implement gives the soil and potatoes a rotary or churning movement, so that a relatively large portion of the soil is separated from the potatoes before they actually reach the final separating frame.

Having thus fully described my invention, what I claim as new, and desire to secure by Letters Patent, is:—

1. In a potato digger, the combination comprising a wheeled supporting frame, a digging member pivotally connected with the frame, a pair of levers pivotally connected with the frame, a rectangular frame secured to the levers, supporting wheels carried by the rectangular frame, conveying mechanism, means for actuating the conveying mechanism from one of the supporting wheels, and separating mechanism disposed below the conveying mechanism.

2. In a potato digger, the combination comprising a wheeled supporting frame, a digging member pivotally connected with the frame, means for raising and lowering the digging member, means for locking the raising and lowering means, a pair of levers pivotally connected with the frame, a rectangular frame secured to the levers, supporting wheels carried by the rectangular frame, conveying mechanism, means for actuating the conveying mechanism from one of the supporting wheels, and separating mechanism disposed below the conveying mechanism.

3. In a potato digger, the combination comprising a wheeled supporting frame, a digging member pivotally connected with the frame, a pair of levers pivotally connected with the frame, a rectangular frame secured to the levers, downwardly extending projections on said levers, a shaft carried by the projections, a sleeve rockably disposed on the shaft and provided with a projection connected with the digging member, a lever carried by the sleeve, means for locking the lever, supporting wheels carried by the rectangular frame, conveying mechanism, means for actuating the conveying mechanism from one of the supporting wheels, and separating mechanism disposed below the conveying mechanism.

4. In a potato digger, the combination comprising a wheeled supporting frame, a digging member pivotally connected with the frame, a pair of levers pivotally connected with the frame, a rectangular frame secured to the levers, downwardly extending projections, on said levers, a shaft carried by the projections, a sleeve rockably disposed on the shaft and provided with a projection connected with the digging member, a lever carried by the sleeve, and provided with a bifurcated rear end, a rack disposed adjacent the lever, pawls carried by the bifurcated rear end of the lever adapted to mesh with the rack, supporting wheels carried by the rectangular frame, conveying mechanism, means for actuating the conveying mechanism from one of the supporting wheels, and separating mechanism disposed below the conveying mechanism.

5. In a potato digger, the combination comprising a U-shaped member, pintles on the U-shaped member, supporting wheels on the pintles, a platform on the U-shaped member, a rack on the platform, a rectangular frame pivotally connected with the U-shaped member, wheels carried by the rectangular frame, a digging member pivotally connected to the U-shaped member, a lever pivoted to the rectangular frame, pawls on the lever adapted to mesh with the rack, and conveying and separating mechanism carried above the lever.

6. In a potato digger, the combination comprising a wheeled supporting frame, a digging member pivotally connected with the frame, a pair of levers pivotally connected with the frame, a rectangular frame secured to the levers, downwardly extending projections on said levers, a shaft carried by the projections, a sleeve rockably disposed on the shaft and provided with a projection connected with the digging member, a lever carried by the sleeve, a link pivoted to the projection and to the digging member, means for locking the lever, supporting wheels carried by the rectangular frame, conveying mechanism, means for actuating the conveying mechanism from one of the supporting wheels, and separating mechanism disposed below the conveying mechanism.

7. In a potato digger, the combination comprising a U-shaped wheeled member, separating mechanism, a pivoted digging member, rearwardly projecting regulating lever handles connected with the digging member, and upwardly inclined conveying mechanism extending above and rearwardly beyond said handles.

In witness whereof I have hereunto set my hand in the presence of two witnesses.

JOSEPH MOREAU.

Witnesses:
C. C. COUSINS,
E. M. SLINEY.